United States Patent
Westhues et al.

(10) Patent No.: US 10,261,604 B2
(45) Date of Patent: Apr. 16, 2019

(54) ACTIVE STYLUS VELOCITY CORRECTION

(71) Applicant: Microsoft Technology Licensing, LLC, Redmond, WA (US)

(72) Inventors: Jonathan Westhues, Portland, OR (US); Tianzhu Qiao, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/604,503

(22) Filed: May 24, 2017

(65) Prior Publication Data

US 2018/0129313 A1  May 10, 2018

Related U.S. Application Data (60) Provisional application No. 62/418,029, filed on Nov. 4, 2016.

(51) Int. Cl.
| | |
|---|---|
| *G06F 3/038* | (2013.01) |
| *G06F 3/041* | (2006.01) |
| *G06F 3/044* | (2006.01) |
| *G06F 3/0354* | (2013.01) |

(52) U.S. Cl.
CPC ........ *G06F 3/03545* (2013.01); *G06F 3/0383* (2013.01); *G06F 3/044* (2013.01); *G06F 3/0416* (2013.01); *G06F 2203/04106* (2013.01)

(58) Field of Classification Search
None
See application file for complete search history.

(56) References Cited

U.S. PATENT DOCUMENTS

| | | |
|---|---|---|
| 2008/0137479 A1 | 6/2008 | Syljuasen et al. |
| 2010/0073325 A1 | 3/2010 | Yang |
| 2011/0074723 A1 | 3/2011 | Reynolds |
| 2012/0327041 A1 | 12/2012 | Harley et al. |

(Continued)

OTHER PUBLICATIONS

"International Search Report and Written Opinion Issued in PCT Application No. PCT/US2017/058919", dated Feb. 8, 2018, 11 Pages.

(Continued)

*Primary Examiner* — Amare Mengistu
*Assistant Examiner* — Sarvesh J Nadkarni
(74) *Attorney, Agent, or Firm* — Alleman Hall Creasman & Tuttle LLP (57) ABSTRACT

A touch-sensitive display device includes a touch sensor having a plurality of touch-sensing electrodes and control logic coupled to the plurality of touch-sensing electrodes. The control logic is configured to, in a non-reference time frame and based on a spatial capacitance measurement received for a first stylus electrode of an active stylus, estimate a non-reference time frame location of the first stylus electrode relative to the plurality of touch-sensing electrodes. In a reference time frame, based on a spatial capacitance measurement received for a second stylus electrode of the active stylus, a reference time frame location of the second stylus electrode is estimated. Based on an estimated velocity of the first stylus electrode, the non-reference location of the first stylus electrode is velocity corrected to give a reference time frame location of the first stylus electrode.

20 Claims, 7 Drawing Sheets

(56) References Cited

U.S. PATENT DOCUMENTS

| | | |
|---|---|---|
| 2012/0327042 A1* | 12/2012 | Harley ............... G06F 3/03545 345/179 |
| 2013/0106718 A1 | 5/2013 | Sundara-rajan |
| 2014/0043251 A1* | 2/2014 | Wilson .................. G06F 3/041 345/173 |
| 2014/0176495 A1 | 6/2014 | Masov |
| 2015/0338932 A1 | 11/2015 | Pant et al. |
| 2016/0170503 A1 | 6/2016 | Varlamov et al. |
| 2016/0188016 A1 | 6/2016 | Munakata et al. |
| 2016/0306447 A1 | 10/2016 | Fleck et al. |
| 2016/0320895 A1 | 11/2016 | Ribeiro |

OTHER PUBLICATIONS

"How do Wacom digitizers pull off the tilt sensitivity feature, exactly?", http://forum.tabletpereview.com/threads/how-do-wacom-digitizers-pull-off-the-tilt-sensitivity-feature-exactly.65012/page-3, Published on: Jan. 1, 2015, 14 pages.

"Stylus Controls", https://www.artrage.com/manuals/artrage-4/stylus-controls/, Published on: 2004, 6 pages.

* cited by examiner

602 — IN A NON-REFERENCE TIME FRAME, BASED ON A SPATIAL CAPACITANCE MEASUREMENT RECEIVED FOR A FIRST STYLUS ELECTRODE OF AN ACTIVE STYLUS, ESTIMATE A NON-REFERENCE TIME FRAME LOCATION OF THE FIRST STYLUS ELECTRODE RELATIVE TO THE PLURALITY OF TOUCH-SENSING ELECTRODES

604 — IN A REFERENCE TIME FRAME, BASED ON A SPATIAL CAPACITANCE MEASUREMENT RECEIVED FOR A SECOND STYLUS ELECTRODE OF THE ACTIVE STYLUS, ESTIMATE A REFERENCE TIME FRAME LOCATION OF THE SECOND STYLUS ELECTRODE RELATIVE TO THE PLURALITY OF TOUCH-SENSING ELECTRODES

606 — BASED ON AN ESTIMATED VELOCITY OF THE FIRST STYLUS ELECTRODE, VELOCITY CORRECT THE NON-REFERENCE TIME FRAME LOCATION OF THE FIRST STYLUS ELECTRODE TO GIVE A REFERENCE TIME FRAME LOCATION OF THE FIRST STYLUS ELECTRODE

ACTIVE STYLUS VELOCITY CORRECTION

CROSS REFERENCE TO RELATED APPLICATIONS

This application claims priority to U.S. Provisional Patent Application No. 62/418,029, filed Nov. 4, 2016, the entirety of which is hereby incorporated herein by reference.

BACKGROUND

Touch-sensitive display devices allow users to interact with computers using fingers, passive styli, active styli, and other input objects. The touch-sensitive display device may detect a touch event each time an input object touches or comes into close proximity with a touch sensor of the touch-sensitive display device. The touch sensor typically includes a plurality of touch-sensing electrodes distributed across the touch sensor to enable capacitance measurements at specific XY locations. A touch event may therefore be interpreted by the touch-sensitive display device as a user input at a particular two-dimensional location relative to the touch-sensitive display device.

Active styli typically include one or more stylus electrodes. These electrodes can be driven with a particular excitation signal to influence electrical conditions on a touch sensor, and/or they can be configured to detect an excitation signal applied to touch-sensing electrodes of the touch sensor.

DETAILED DESCRIPTION

Active styli used with touch-sensitive display devices can benefit from having more than one electrode that interacts with a touch sensor. One example is to have two or more electrodes at or near one end of a stylus. In such an implementation, tracking the relative locations of the electrodes simultaneously or sequentially can be used to determine when the stylus is tilted or rotated. However, using multiple stylus electrodes can present various challenges. Sophisticated and/or expensive hardware may be necessary in order to simultaneously detect the locations of two different stylus electrodes, for example by running multiple simultaneous correlation operations in receive circuitry. Alternatively, the stylus electrode locations can be sequentially detected and combined in order to ascertain stylus rotation, tilt angle, etc., though this approach can be vulnerable to errors and inaccuracy as a result of stylus movement.

Accordingly, the present disclosure contemplates a technique for detecting the position of an active stylus relative to a touch sensor, where the active stylus has two or more stylus electrodes in its operative end or otherwise situated to enable simultaneous interaction with the touch sensor. Over a series of time frames, the location of each stylus electrode in the operative end of the active stylus is detected independently. The locations of the detected stylus electrodes are combined in order to determine a position of the active stylus, which can refer to a location at which touch input should be registered relative to the touch-sensitive display (e.g., a position of the tip of the stylus) and/or to a twist or tilt condition of the stylus. However, when the active stylus moves relative to the touch sensor between detection of the locations of the stylus electrodes, combining of the detections can result in an incorrect position of the active stylus being identified.

Accordingly, after detecting a location of a first stylus electrode in a non-reference time frame, and detecting a location of a second stylus electrode in a reference time frame, the non-reference location of the first stylus electrode can be velocity corrected based on an estimated velocity of the first stylus electrode. This gives a reference time frame location of the first stylus electrode. Once the reference time frame locations of all relevant stylus electrodes are known, these locations can be used to determine a position of the active stylus, which may include a location of touch input relative to the plurality of touch-sensing electrodes, a tilt parameter of the active stylus, and/or a twist parameter of the active stylus.

A tilt parameter may include one or more angles specifying the orientation or attitude of the active stylus relative to the touch-sensitive display device. For example, the tilt parameter may specify at what angle the active stylus intersects a plane perpendicular to the display, and/or at what angle the active stylus is "pointing" relative to a coordinate system defined on the surface of the display (i.e., tilt direction in a "north-south-east-west" sense over the plane of the display). Similarly, the twist parameter may define rotation of the stylus about an elongate axis extending through the stylus body. Each of these values can then be leveraged by software running on the touch-sensitive display device, and/or any associated computing devices, thereby allowing users to perform more sophisticated touch input.

Figure 1:
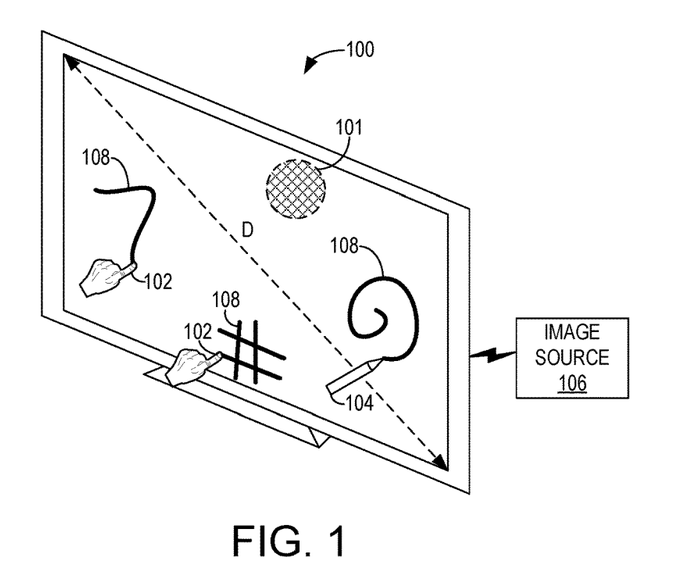
FIG. 1 schematically depicts an example touch-sensitive display device.

FIG. 1 shows a touch-sensitive display device 100 including a touch sensor 101. In some examples, display device 100 may be a large-format display device with a diagonal dimension D greater than 1 meter, for example, though the display may assume any suitable size. Display device 100 may be configured to sense one or more sources of input, such as touch input imparted via a digit 102 of a user and/or input supplied by an input device 104, shown in FIG. 1 as an active stylus. Digit 102 and input device 104 are provided as non-limiting examples and any other suitable source of input may be used in connection with display device 100. Further, display device 100 may be configured to receive input from input devices in contact with the display device 100 and input devices not in contact with the display device 100 (e.g., input devices that hover proximate to a surface of the display). "Touch input" as used herein refers to both types of input. In some examples, display device 100 may be configured to receive input from two or more sources simultaneously, in which case the display device may be referred to as a multi-touch display device.

Display device 100 may be operatively coupled to an image source 106, which may be, for example, a computing device external to, or housed within, the display device 100. Image source 106 may receive input from display device 100, process the input, and in response generate appropriate graphical output 108 for the display device 100. In this way, display device 100 may provide a natural paradigm for interacting with a computing device that can respond appropriately to touch input. Details regarding an example computing device are described below with reference to FIG. 9.

Figure 2:
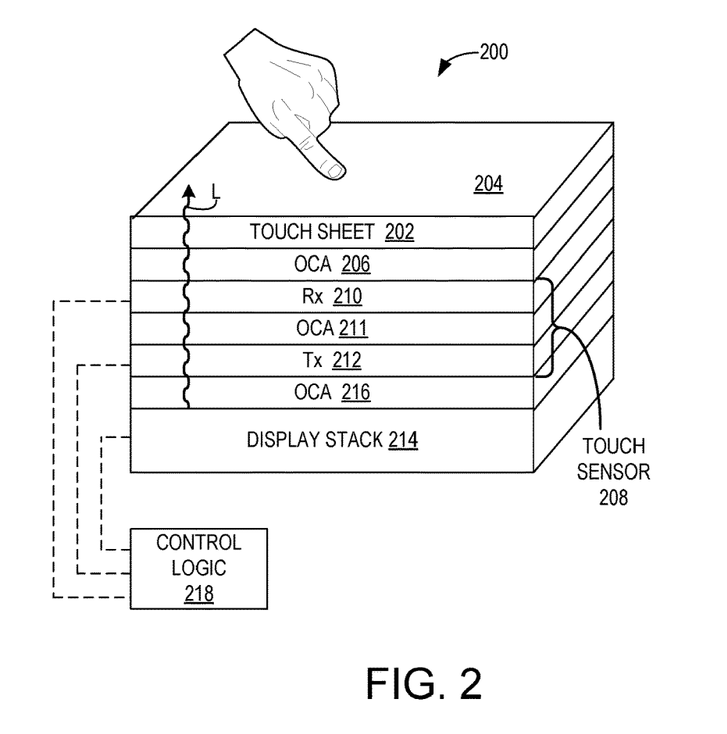
FIG. 2 schematically depicts an optical stack and associated subsystems of the touch-sensitive display device of FIG. 1.

FIG. 2 is a cross-sectional view of an optical stack 200 of display device 100 of FIG. 1. Optical stack 200 includes a plurality of components configured to enable the reception of touch input and the generation of graphical output. Optical stack 200 may include an optically-clear touch sheet 202 having a top surface 204 for receiving touch input, and an optically-clear adhesive (OCA) 206 bonding a bottom surface of the touch sheet 202 to a top surface of a touch sensor 208, which may correspond to touch sensor 101 of FIG. 1, for example. Touch sheet 202 may be comprised of any suitable material(s), such as glass, plastic, or another material. As used herein, "optically-clear adhesive" refers to a class of adhesives that transmit substantially all (e.g., about 99%) of incident visible light.

As described in further detail below with reference to FIG. 3, touch sensor 208 includes a matrix of touch-sensing electrodes that form capacitors whose capacitances may be evaluated in detecting touch input. As shown in FIG. 2, the electrodes may be formed in two separate layers: a receive electrode layer (Rx) 210 and a transmit electrode layer (Tx) 212 positioned below the receive electrode layer. For example, receive and transmit electrode layers 210 and 212 each may be formed on a respective dielectric substrate comprising materials including but not limited to glass, polyethylene terephthalate (PET), or cyclic olefin polymer (COP) film. Receive and transmit electrode layers 210 and 212 may be bonded together by a second optically-clear adhesive (OCA) 211. OCA 211 may be an acrylic pressure-sensitive adhesive film, for example.

The touch sensor configuration illustrated in FIG. 2 is provided as an example, and other arrangements are within the scope of this disclosure. For example, in other implementations, layers 210, 211, and 212 may be integrally formed as a single layer with electrodes disposed on opposite surfaces of the integral layer. Further, touch sensor 208 may alternatively be configured such that transmit electrode layer 212 is provided above, and bonded, via OCA 211, to receive electrode layer 210 positioned therebelow.

Receive and transmit electrode layers 210 and 212 may be formed by a variety of suitable processes. Such processes may include deposition of metallic wires onto the surface of an adhesive, dielectric substrate; patterned deposition of a material that selectively catalyzes the subsequent deposition of a metal film (e.g., via plating); photoetching; patterned deposition of a conductive ink (e.g., via inkjet, offset, relief, or intaglio printing); filling grooves in a dielectric substrate with conductive ink; selective optical exposure (e.g., through a mask or via laser writing) of an electrically conductive photoresist followed by chemical development to remove unexposed photoresist; and selective optical exposure of a silver halide emulsion followed by chemical development of the latent image to metallic silver, in turn followed by chemical fixing. In one example, metalized sensor films may be disposed on a user-facing side of a substrate, with the metal facing away from the user or alternatively facing toward the user with a protective sheet (e.g., comprised of PET) between the user and metal.

Although transparent conducting oxide (TCO) is typically not used in the electrodes, partial use of TCO to form a portion of the electrodes with other portions being formed of metal is possible. In one example, the touch-sensing electrodes may be thin metal of substantially constant cross section, and may be sized such that they may not be optically resolved and may thus be unobtrusive as seen from a perspective of a user. Suitable materials from which electrodes may be formed include various suitable metals (e.g., aluminum, copper, nickel, silver, gold), metallic alloys, conductive allotropes of carbon (e.g., graphite, fullerenes, amorphous carbon), conductive polymers, and conductive inks (e.g., made conductive via the addition of metal or carbon particles).

Continuing with FIG. 2, touch sensor 208 is bonded, at a bottom surface of transmit electrode layer 212, to a display stack 214 via a third optically-clear adhesive (OCA) 216. Display stack 214 may be a liquid crystal display (LCD) stack, organic light-emitting diode (OLED) stack, or plasma display panel (PDP), for example. Display stack 214 is configured to emit light L through a top surface of the display stack, such that emitted light travels in a light emitting direction through layers 216, 212, 211, 210, 206, touch sheet 202, and out through top surface 204. In this way, emitted light may appear to a user as an image displayed on top surface 204 of touch sheet 202.

Further variations to optical stack 200 are possible. For example, implementations are possible in which layers 211 and/or 216 are omitted. In this example, touch sensor 208 may be air-gapped and optically uncoupled to display stack 214. Further, layers 210 and 212 may be laminated on top surface 204. Still further, layer 210 may be disposed on top surface 204 while layer 212 may be disposed opposite and below top surface 204.

FIG. 2 also shows control logic 218 operatively coupled to receive electrode layer 210, transmit electrode layer 212, and display stack 214. Control logic 218 is configured to drive transmit electrodes in transmit electrode layer 212, receive signals resulting from driven transmit electrodes via receive electrodes in receive electrode layer 210, and locate, if detected, touch input imparted to optical stack 200. Control logic 218 may further drive display stack 214 to enable graphical output responsive to touch input. Two or more control logics may alternatively be provided, and in some examples, respective control logics may be implemented for each of receive electrode layer 210, transmit electrode layer 212, and display stack 214. In some implementations, control logic 218 may be implemented in image source 106 of FIG. 1.

Figure 3:
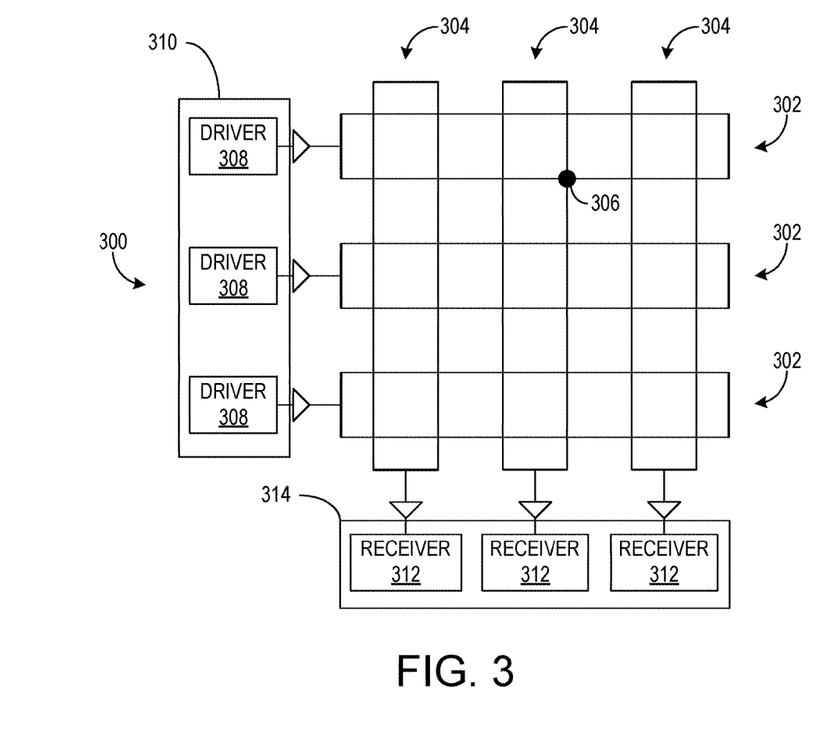
FIG. 3 schematically depicts an example touch sensor of the touch-sensitive display device of FIG. 1, including a plurality of touch-sensing electrodes.

FIG. 3 shows an example touch sensor matrix 300. Matrix 300 may be included in touch sensor 208 of optical stack 200 of FIG. 2 to bestow touch sensing functionality to touch-sensitive display device 100 of FIG. 1, for example. Matrix 300 includes a plurality of touch-sensing electrodes in the form of transmit rows 302 vertically separated from receive columns 304. Transmit rows 302 and receive columns 304 may be respectively formed in transmit electrode layer 212 and receive electrode layer 210 of optical stack 200, for example. Each vertical intersection of transmit rows 302 with receive columns 304 forms a corresponding node such as node 306 whose electrical properties (e.g., capacitance) may be measured to detect touch input. Three transmit rows 302 and three receive columns 304 are shown in FIG. 3 for the purpose of clarity, though matrix 300 may include any suitable number of transmit rows and receive columns, which may be on the order of one hundred or one thousand, for example.

While a rectangular grid arrangement is shown in FIG. 3, matrix 300 may assume other geometric arrangements—for example, the matrix may be arranged in a diamond pattern. Alternatively or additionally, individual electrodes in matrix 300 may assume nonlinear geometries—e.g., electrodes may exhibit curved or zigzag geometries, which may minimize the perceptibility of display artifacts (e.g., aliasing, moiré patterns) caused by occlusion of an underlying display by the electrodes. The transmit rows 302 and receive columns 304 may be positioned/oriented according to any suitable layout. For example, transmit rows 302 may be oriented horizontally with respect to ground, vertically with respect to ground, or at another angle. Likewise, receive columns 304 may be oriented horizontally with respect to ground, vertically with respect to ground, or at another angle.

Each transmit row 302 in matrix 300 may be attached to a respective driver 308 configured to drive its corresponding transmit row with a time-varying voltage. In some implementations, drivers 308 of matrix 300 may be driven by a microcoded state machine implemented within a field-programmable gate array (FPGA) forming part of controller 218 of FIG. 2, for example. Each driver 308 may be implemented as a shift register having one flip-flop and output for its corresponding transmit row, and may be operable to force all output values to zero, independently of register state. The inputs to each shift register may be a clock, data input, and a blanking input, which may be driven by outputs from the microcoded state machine. Signals may be transmitted by filling the shift register with ones on every output to be excited, and zeroes elsewhere, and then toggling the blanking input with a desired modulation. Such signals are referred to herein as "excitation sequences", as these signals may be time-varying voltages that, when digitally sampled, comprise a sequence of pulses—e.g., one or more samples of a relatively higher digital value followed by one or more samples of a relatively lower digital value, or vice versa. If the shift register is used in this fashion, excitation sequences may take on only two digital values—e.g., only binary excitation sequences can be transmitted. In other implementations, drivers 308 may be configured to transmit non-binary excitation sequences that can assume three or more digital values. Non-binary excitation sequences may enable a reduction in the harmonic content of driver output and decrease the emissions radiated by matrix 300.

The drivers 308 may collectively be implemented as drive circuitry 310. Circuitry 310 may be configured to receive commands/inputs from one or more computer components, for example. Further, circuitry 310 may coordinate the activation of each driver 308. For example, circuitry 310 may establish an order in which each driver 308 is driven, as well as determine the signal each driver uses to drive its corresponding row.

Figure 4:
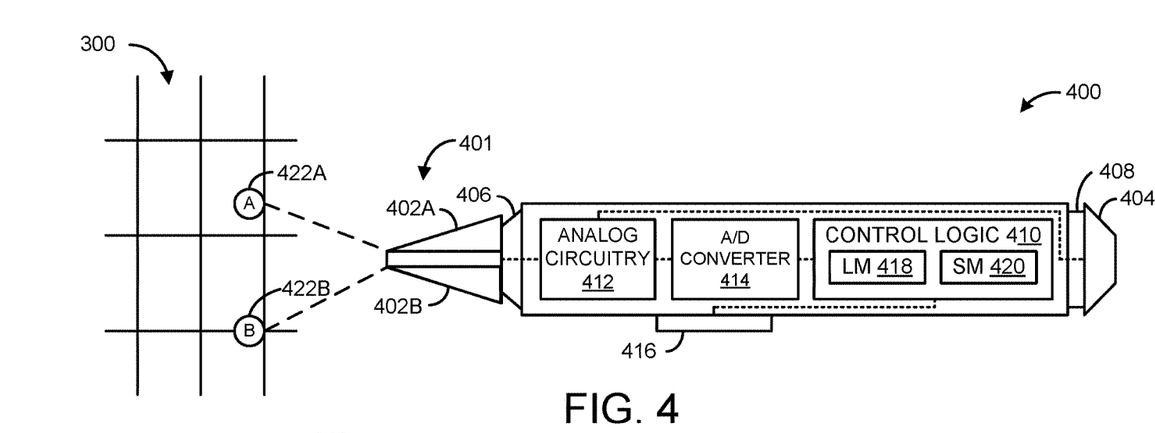
FIGS. 4 and 5 schematically depict example active styli.
Figure 5:
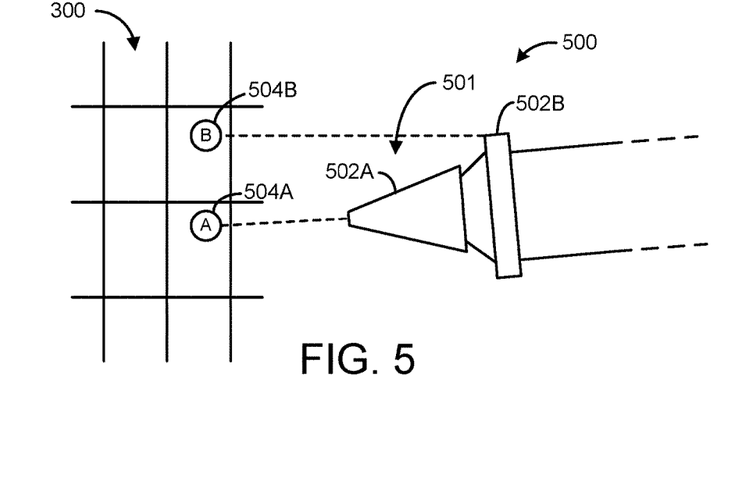

In some implementations, matrix 300 may be configured to communicate with an active stylus, such as active stylus 400 or active stylus 500 shown in FIGS. 4 and 5 respectively. This implementation may at least partially enable touch sensitive display device 100 to communicate with input device 104 when matrix 300 is implemented in display device 100. Specifically, an electrostatic channel may be established between one or more transmit rows 302 and a conductive element (e.g., electrode tip) of an active stylus, along which data may be transmitted. In one example, communication via the electrostatic channel is initiated by the transmission of a synchronization pattern from matrix 300 to the active stylus. The synchronization pattern may enable matrix 300 and the active stylus to obtain a shared sense of time, and may be transmitted via multiple transmit rows 302 so that the active stylus can receive the pattern regardless of its position relative to the matrix. The shared sense of time may facilitate the correlation of a time at which the active stylus detects an excitation sequence or other signal transmitted on transmit rows 302 to a location in matrix 300, as the synchronization pattern may yield an indication of the order in which transmit rows 302 are driven.

Each receive column 304 in matrix 300 may be coupled to a respective receiver 312 configured to receive signals resulting from the transmission of excitation sequences on transmit rows 302. The receivers 312 may be collectively implemented as receive circuitry 314. Circuitry 314 may be configured to process and interpret electrical signals detected by the receivers, with the aim of identifying and localizing touch events performed on matrix 300. During touch detection, matrix 300 may hold all transmit rows 302 at a constant voltage except for one or more active transmit rows along which one or more excitation sequences are transmitted. During transmission of the excitation sequences, all receive columns 304 may be held at a constant voltage (e.g., ground). With the excitation sequences applied to the active transmit rows 302 and all receive columns 304 held at the constant voltage, a current may flow through each of the nodes formed by the vertical intersections of the active transmit rows with the receive columns. Each current may be proportional to the capacitance of its corresponding node. Hence, the capacitance of each node may be measured by measuring each current flowing from the active transmit rows 302. In this way, touch input may be detected by measuring node capacitance. Matrix 300 may be repeatedly scanned at a frame rate (e.g., 60 Hz, 120 Hz) to persistently detect touch input, where a complete scan of a frame comprises applying an excitation sequence to each transmit row 302, and for each driven transmit row, collecting output from all of the receive columns 304. However, in other examples, a complete scan of a frame may be a scan of a desired subset, and not all, of one or both of transmit rows 302 and receive columns 304.

Throughout the present disclosure, touch-sensitive matrices, such as matrix 300, are generally described as having a plurality of row electrodes and column electrodes, with one or more drivers/receivers coupled to each row/column. However, in some implementations, rather than using drive circuitry 310 and receive circuitry 314 to interpret capacitance in entire rows/columns at once, matrix 300 may be constructed such that each node (e.g., node 306) comprises a separate, independent touch-sensing electrode. Accordingly, each node may be coupled with drive and/or receive circuitry (or other control circuitry/logic) to transmit an excitation sequence to an active stylus and/or receive an excitation sequence transmitted by an active stylus. For example, the described mechanisms can be employed in the context of an in-cell touch sensor in which self-capacitance measurements are used at individual sensels corresponding to specific XY locations on the touch sensor. It will be appreciated that the touch input detection techniques described herein are generally applicable regardless of what type of touch-sensing electrodes are utilized, or how such touch-sensing electrodes are arranged.

Other measurements may be performed on matrix 300 to detect touch, alternatively or additionally to the measurement of capacitance—for example, a time delay between the transmission of an excitation sequence and reception of a received signal resulting from the transmitted excitation sequence, and/or a phase shift between the transmitted excitation sequence and the resulting received signal may be measured.

The above described touch sensor matrix is provided as an example, and is meant to be non-limiting. Other touch sensor configurations may be employed without departing from the scope of the present disclosure. In general, a touch sensor matrix will include a plurality of touch-sensing electrodes and control logic coupled to the plurality of touch-sensing electrodes, the control logic usable to detect touch input via the plurality of touch-sensing electrodes. The specific shape, distribution, and other properties of the touch-sensing electrodes and control logic can vary from implementation to implementation.

As indicated above, and will be further described below, a touch-sensitive display device including a touch sensor matrix, such as matrix 300, can receive touch input from an active stylus. Interactions between touch-sensing electrodes of the touch-sensitive display device and stylus electrodes of the active stylus can be interpreted by control logic of either or both of the touch-sensitive display device and the active stylus in order to determine locations of stylus electrodes relative to the touch-sensitive display. These locations may be used to calculate a position of the active stylus, which can include a location relative to the touch-sensitive display at which touch input is provided, a tilt parameter of the active stylus, and/or a twist parameter of the active stylus.

FIG. 4 shows an example active stylus 400 usable with a touch-sensitive display device incorporating matrix 300 of FIG. 3. Active stylus 400 includes a stylus tip 401 having a first stylus electrode 402A and a second stylus electrode 402B. Interactions between these stylus electrodes and touch-sensing electrodes of the touch-sensitive display device result in control logic of the touch-sensitive display device receiving spatial capacitance measurements for each stylus electrode, as will be described in more detail below. Active stylus 400 also includes an electrode eraser 404 on an opposing end of the stylus relative to stylus tip 401. It will be appreciated that the tip and eraser ends of active stylus 400 may each have any suitable number of stylus electrodes, though active styli described herein will generally have at least one operative end with more than one stylus electrode. The tip electrodes 402 and the electrode eraser 404 may be electrically conductive and configured to receive current when proximate to a driven touch-sensing electrode of electrode matrix 300 of FIG. 3.

Active stylus 400 may include a pressure sensor 406 configured to detect a pressure when the tip is pressed against a surface. Likewise, eraser 404 may include a pressure sensor 408 configured to detect a pressure when eraser 404 is pressed against a surface. In one example, each of pressure sensors 406 and 408 are force sensitive resistors. A touch pressure value of each of the respective pressure sensors 406 and 408 may be sent to a control logic 410. In one example, the touch pressure value may be represented by a 6-bit value.

As shown, tip electrodes 402 and electrode eraser 404 are operatively coupled to analog circuitry 412. Analog circuitry 412 may include linear analog componentry configured to maintain the tip/eraser electrodes at a constant voltage and convert any current into or out of the tip/eraser into a proportional current-sense voltage.

An analog-to-digital (A/D) converter 414 is operatively coupled to analog circuitry 412 and configured to digitize voltages received from analog circuitry 412 into digital data to facilitate subsequent processing. As a non-limiting example, converter 414 may convert incoming electrostatic signals having bandwidths of 100 kHz at a sampling rate of 1 Mbit/s.

In the depicted example, active stylus 400 includes a barrel switch button 416 that may be operated by a user to provide additional user input. A depression state of button 416 (e.g., depressed, not depressed, partially depressed) may be sent to control logic 410.

The control logic 410 includes a logic machine 418 and a storage machine 420 configured to hold instructions executable by logic machine 418 to perform various operations discussed herein. For example, control logic 410 may be configured to receive signals from various sensors including pressure sensor 406, pressure sensor 408, and button 416. Further, control logic 410 may be configured to process digitized signals from A/D converter 414 to perform other operations discussed herein.

Via interactions between stylus electrodes 402 of active stylus 400 and touch-sensing electrodes associated with matrix 300, spatial capacitance measurements 422 for each stylus electrode can be localized to particular two-dimensional locations relative to the touch-sensitive display. "Spatial capacitance measurement," as used herein, refers to a measured capacitance between a stylus electrode and a touch-sensing electrode. The measurement is achieved via driving one electrode and interpreting resultant electrical conditions at the other electrode (i.e., drive a stylus electrode and receive at a touch-sensing electrode, or drive at a touch-sensing electrode and receive at a stylus electrode). Typically, the measurement is localized to a particular two-dimensional location relative to the touch-sensitive display device. The two-dimensional location of the spatial capacitance measurement corresponds to the location of a stylus electrode relative to the display when the stylus electrode was either driven with an excitation signal that was detected by a touch-sensing electrode, or detected an excitation signal from a touch-sensing electrode.

This is shown in FIG. 4, in which spatial capacitance measurements 422A and 422B, corresponding to stylus electrodes 402A, and 402B respectively, are shown at different two-dimensional locations on matrix 300. As will be described in more detail below, control logic of the touch-sensitive display device may use these spatial capacitance measurements to calculate a position of the active stylus, which can include tip position, tilt parameter, and/or twist parameter of the active stylus.

FIG. 5 schematically shows a portion of an alternative active stylus 500 that can be used in a similar manner to active stylus 400. As with active stylus 400, active stylus 500 includes a tip 501 and multiple stylus electrodes 502, including a first stylus electrode 502A and a second stylus electrode 502B. In active stylus 500, the second stylus electrode is a "ring" electrode, meaning it is disposed within a ring encircling the body of the active stylus. In general, a ring electrode may have any suitable size and shape, and may have any position relative to the active stylus. "Ring electrode," as used herein, refers to any electrically conducting structure that encircles a stylus body.

As active stylus 500 includes two stylus electrodes, the control logic of the touch-sensitive display device will receive two spatial capacitance measurements corresponding to the two stylus electrodes of the active stylus. These spatial capacitance measurements are shown in FIG. 5 as spatial capacitance measurements 504A and 504B, which have been localized to two-dimensional locations relative to matrix 300 and correspond to stylus electrodes 502A and 502B respectively.

As indicated above, a capacitance at a particular location relative to a touch sensor may be measured either when a touch-sensing electrode detects a signal transmitted by a stylus electrode, or a stylus electrode detects a signal transmitted by a touch-sensing electrode. Accordingly, localizing spatial capacitance measurements to two-dimensional locations may require only driving touch-sensing electrodes, only driving stylus electrodes, or some combination of driving both touch-sensing electrodes and stylus electrodes.

Active styli as described herein may therefore be configured to operate in one or both of a receive mode and a drive mode. Further, an active stylus may operate in a hybrid mode, in which one or more stylus electrodes are driven while one or more other stylus electrodes receive. Receive mode may be employed (1) to synchronize an active stylus with the computing device/processor associated with the touch-sensor, to establish/maintain a shared sense of time; and (2) to measure capacitance at one or more touch-sensing electrodes of the touch-sensitive display device. Synchronization typically occurs at the beginning of a touch-sensing time frame, in which one or more rows on the touch-sensor matrix are driven with a synchronization pulse that can induce/vary electrical conditions on one or more stylus electrodes. The received signal is processed by the control logic, typically via a correlation operation, in order to establish/maintain the shared sense of timing. Usually, multiple rows, spanning the entire height/width of the touch-sensor matrix, are driven with the synchronization pulse so that the active stylus receives an adequate signal regardless of its position relative to the touch-sensor matrix.

An active stylus may also operate in a receive mode during normal driving of the touch-sensing electrodes of a touch-sensor matrix. For example, the control logic of a touch-sensor matrix may be configured to apply a drive signal to each of a plurality of touch-sensing electrodes (e.g., one row at a time), thereby influencing electrical conditions at one or more stylus electrodes to enable the active stylus to calculate spatial capacitance measurements. As an example, control logic 410 of active stylus 400 may be configured to detect conditions on one or both of the first and second stylus electrodes caused by a drive signal applied from the touch sensor, to enable a display-initiated spatial capacitance measurement over the touch sensor. In other words, active stylus 400 may receive signals while the rows are scanned to detect when one or more rows proximate to the stylus electrodes of the active stylus are driven, and this detection may indicate at least one spatial coordinate (e.g., a Y coordinate) of a stylus electrode at the time of a spatial capacitance measurement. In some implementations, both spatial coordinates of the spatial capacitance measurement may be calculated while the active stylus is in receive mode, though typically only one spatial coordinate will be calculated.

The receive circuitry typically runs a correlation operation that is tuned to the drive signal(s) being used on the touch-sensor matrix. Upon receiving a signal of greatest amplitude (e.g., highest correlation), the active stylus makes a note of the timing of that highest signal. The recorded timing allows the active stylus and control logic of a touch-sensitive display device to know which row each electrode of the active stylus was closest to, thereby providing a Y coordinate of the location of each stylus electrode relative to the touch-sensitive display device when a capacitance was measured. In other words, spatial capacitance measurements received by the control logic of the touch-sensitive display device are calculated by the active stylus based on the electrical conditions influenced by the drive signal applied to each of the plurality of touch-sensing electrodes.

In some examples, the active stylus reports spatial capacitance measurements (e.g., timing, value of a row counter) to control logic of the touch-sensitive display device over some type of wireless link (e.g., a radio transmitter). Accordingly, the control logic may receive the spatial capacitance measurements calculated by the active stylus via a communications interface of the touch-sensitive display device. Instead of or in addition to a radio link, spatial capacitance measurements may be transmitted electrostatically via excitation of the stylus electrodes.

In some implementations, interpolation may be employed to increase positional resolution. For example, assuming a highest amplitude at row K, amplitudes may also be noted for rows K−2, K−1, K+1, K+2. Assessing the amplitudes for these neighboring rows can enable finer determinations of the position of the spatial capacitance measurement. Essentially, the active stylus "listens" for a communication from rows, and based on the "loudness" of that communication, an assessment is made as to how close the active stylus is to the row that is "talking." By assessing communication volume from a few rows on either side of the "loudest" row, a higher position granularity may be determined.

In addition to or in lieu of receiving during a "sync subframe" and during a "row-drive" subframe, an active stylus may drive its stylus electrodes during a "stylus-drive" subframe. As an example, control logic 410 of active stylus 400 may be configured to drive one or both of the first and second stylus electrodes to enable a stylus-initiated spatial capacitance measurement over the touch sensor of the touch-sensitive display device. This may enable calculation of at least one spatial coordinate (e.g., an X coordinate) of the stylus electrode when a spatial capacitance measurement is taken. Again, in some implementations, both spatial coordinates of a spatial capacitance measurement may be calculated while the active stylus is in drive mode, though typically only one spatial coordinate will be calculated.

It will be understood that either or both of a stylus-initiated spatial capacitance measurement and the display-initiated spatial capacitance measurement may be usable by control logic of the touch-sensitive display device to calculate a tip position, tilt parameter, and/or twist parameter of the active stylus. From the perspective of the touch-sensitive display device, the control logic calculates spatial capacitance measurements for each of the plurality of stylus electrodes based on electrical conditions detected at one or more touch-sensing electrodes, the electrical conditions being influenced by the drive signal applied to the stylus electrodes of the active stylus. Additionally, or alternatively, the active stylus may calculate the spatial capacitance measurements for each of its stylus electrodes based on electrical conditions influenced by a drive signal applied at one or more touch-sensing electrodes, and the active stylus may transmit the calculated spatial capacitance measurements to the touch-sensitive display device.

Control logic of the touch-sensitive display device may correlate, as described above, in order to interpret the received signals. For example, a column experiencing the highest signal, or an above-threshold signal, may be deduced to be the column the driven electrode is closest to, thereby establishing the X location of the driven electrode at the time of the spatial capacitance measurement. And as with the Y determination, the conditions at a clustered grouping of columns may be used to establish a higher positional resolution.

Spatial capacitance measurements indicating location of stylus electrodes of an active stylus may generally be received by control logic of the touch-sensitive display device at the same time, or sequentially. As indicated above, taking these measurements simultaneously (e.g., two or more stylus electrodes are driven at the same time with different excitation signals) typically requires more complicated and expensive receive circuitry on the touch-sensitive display device. Alternatively, the stylus electrode location can be sequentially detected and combined in order to ascertain stylus position, which can include touch input location (e.g., tip position), rotation, tilt angle, etc. Specifically, the location of each stylus electrode can be determined in a separate time frame, alleviating the need for complex receivers that can interpret multiple reference signals at once.

However, locating stylus electrodes sequentially can introduce uncertainty as to the position of the active stylus during any single time frame. As an example, the location of a first stylus electrode may be determined in a first time frame, and the location of a second stylus electrode may be determined in a second time frame. If the active stylus does not move between these two measurements, then the first and second stylus electrode location may be combined and interpreted to determine the position of the active stylus. However, in another scenario, the active stylus may move during the interval of time between the first stylus electrode location being detected and the second stylus electrode location being detected. In this case, the more recent, and therefore more accurate, location of the second stylus electrode may be combined with the outdated location of the first stylus electrode, leading the touch-sensitive display device to calculate an incorrect position of the active stylus. This can cause the touch-sensitive display device to register touch input at a location that differs from the current position of the active stylus.

Figure 6:
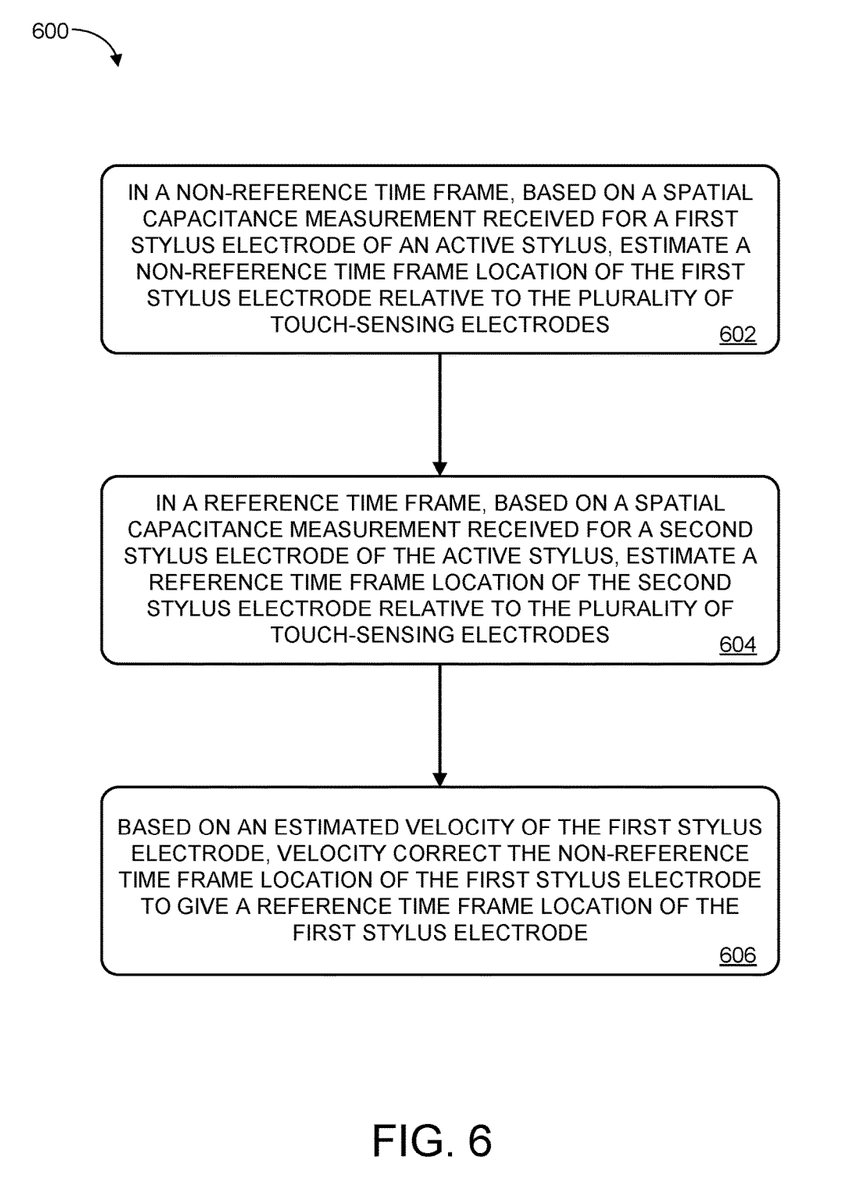
FIG. 6 illustrates an example method for compensating for movement of an active stylus.

Accordingly, FIG. 6 illustrates an example method 600 for compensating for movement of an active stylus. Throughout the present disclosure, an active stylus will be assumed to have two electrodes in a single operative end (e.g., tip or eraser), though it will be appreciated that the techniques described herein can be applied to styli having more than two electrodes.

At 602, method 600 includes, in a non-reference time frame, estimating a non-reference time frame location of a first stylus electrode of an active stylus relative to the plurality of touch-sensing electrodes. This non-reference time frame location may be estimated based on a spatial capacitance measurement received for the first stylus electrode by control logic of the touch-sensitive display device during a non-reference time frame.

At 604, method 600 includes, in a reference time frame, estimating a reference time frame location of a second stylus electrode of the active stylus relative to the plurality of touch-sensing electrodes. As with the non-reference time frame location of the first stylus electrode, the reference time frame location of the second stylus electrode may be estimated based on a spatial capacitance measurement received for the second stylus electrode by control logic of the touch-sensitive display device during a reference time frame.

It will be understood that the non-reference time frame and the reference time frame may occur in any order. For example, the non-reference time frame may occur before the reference time frame, or after. Further, the non-reference and reference time frames do not need to be sequential, and one or more other time frames may occur between the reference and non-reference time frames.

Figure 7:
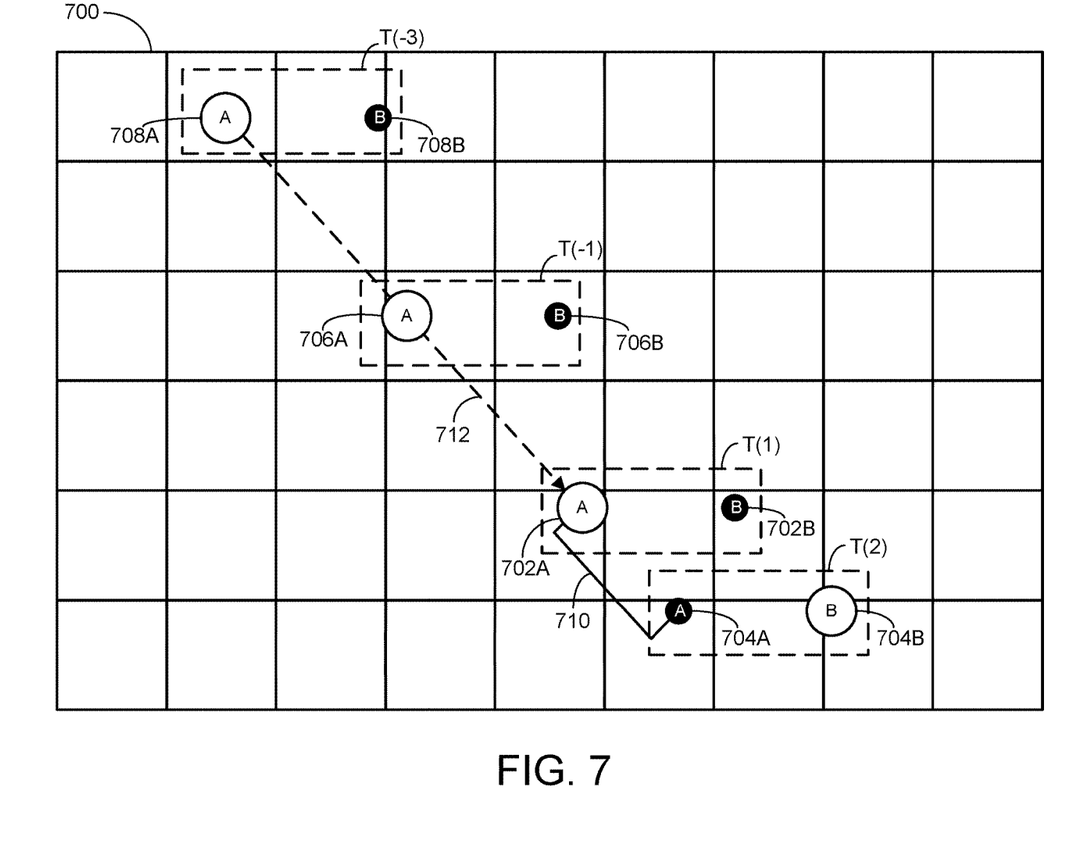
FIG. 7 illustrates velocity correction of an estimated stylus electrode location.

At 606, method 600 includes, based on an estimated velocity of the first stylus electrode, velocity correcting the non-reference time frame location of the first stylus electrode to give a reference time frame location of the first stylus electrode. This is schematically illustrated in FIG. 7, which shows an example touch-sensor matrix 700, and a series of stylus electrode locations relative to the matrix over a series of time frames. Specifically, FIG. 7 shows stylus electrode locations 702A and 702B during a first time frame T(1), and stylus electrode locations 704A and 704B during a second time frame T(2).

In this example, time frame T(1) will be referred to as the non-reference time frame, and time frame T(2) will be referred to as the reference time frame. However, as indicated above, the reference and non-reference time frames may occur in any suitable order.

In FIG. 7, stylus electrode locations that are actually detected by the touch-sensitive display device during a particular time frame are shown with large white circles. The smaller black circles indicate that a stylus electrode was at that location during the time frame, though the location of the stylus electrode was not detected by the touch-sensitive display device, as the other stylus electrode was detected instead.

As shown, the location of the first stylus electrode (i.e., location 702A) was detected during the non-reference time frame T(1), while the location of the second stylus electrode (i.e., location 704B) was detected during the reference time frame T(2). In other words, the active stylus moved between the non-reference and reference time frames. Accordingly, the non-reference time frame location 702A of the first stylus electrode may be velocity corrected based on an estimated velocity of the first stylus electrode to give a reference time frame location of the first stylus electrode, thereby enabling the locations of both the first and second stylus electrodes to be known in the same time frame.

In some examples, velocity correcting the non-reference time frame location of the first stylus electrode includes multiplying the estimated velocity of the first stylus electrode by an elapsed time since the non-reference time frame. Note that when the reference time frame occurs before the non-reference time frame, the estimated velocity may instead be multiplied by an elapsed time since the reference time frame. This gives an estimated offset of the first stylus electrode. The non-reference time frame location of the first stylus electrode may then be offset according to the estimated offset, giving the reference time frame location of the first stylus electrode. For example, based on an estimated velocity of the first stylus electrode, an estimated offset 710 may be calculated for the non-reference time frame location 702A of the first stylus electrode. If this location is offset by estimated offset 710, a reference time frame location of the first stylus electrode is given that matches the actual location 704A of the first stylus electrode during reference time frame T(2). It will be understood that, in other examples, velocity correction may be performed in other suitable ways.

In some examples, the estimated velocity of the first stylus electrode is calculated by estimating a current location of the first stylus electrode during each of a series of previous time frames, and calculating a rate of movement of the first stylus electrode during the series of previous time frames. The series of previous time frames may include any suitable number of time frames, and may in some cases be selected from a "sliding window" of time frames preceding a current time frame. In other words, the series of previous time frames may include a dynamically updating set number of time frames preceding a current time frame (e.g., the series of previous time frames may include, for example, the five most recent time frames). In FIG. 7, an estimated velocity of the first stylus electrode is represented by arrow 712, and is estimated based on locations 706A and 708A of the first stylus electrode during previous time frames T(−1) and T(−3).

Though the above description focuses on velocity correcting a known location of the first stylus electrode, it will be understood that in some examples, velocity correction may be performed before a stylus electrode location is determined. For example, in some cases, a first spatial capacitance measurement corresponding to the first stylus electrode may be received in the non-reference time frame, and not yet used to determine the location of the first stylus electrode. In other words, the location of the first spatial capacitance measurement may be recorded, without performing any additional processing to derive the actual position of the first stylus electrode from the first spatial capacitance measurement. Once a second spatial capacitance measurement corresponding to the second stylus electrode is received during the reference time frame, then velocity correction may be applied to the first spatial capacitance measurement. The velocity corrected first spatial capacitance measurement, and the second spatial capacitance measurement, may then be used to derive reference time frame locations of the first and second stylus electrodes.

Figure 8:
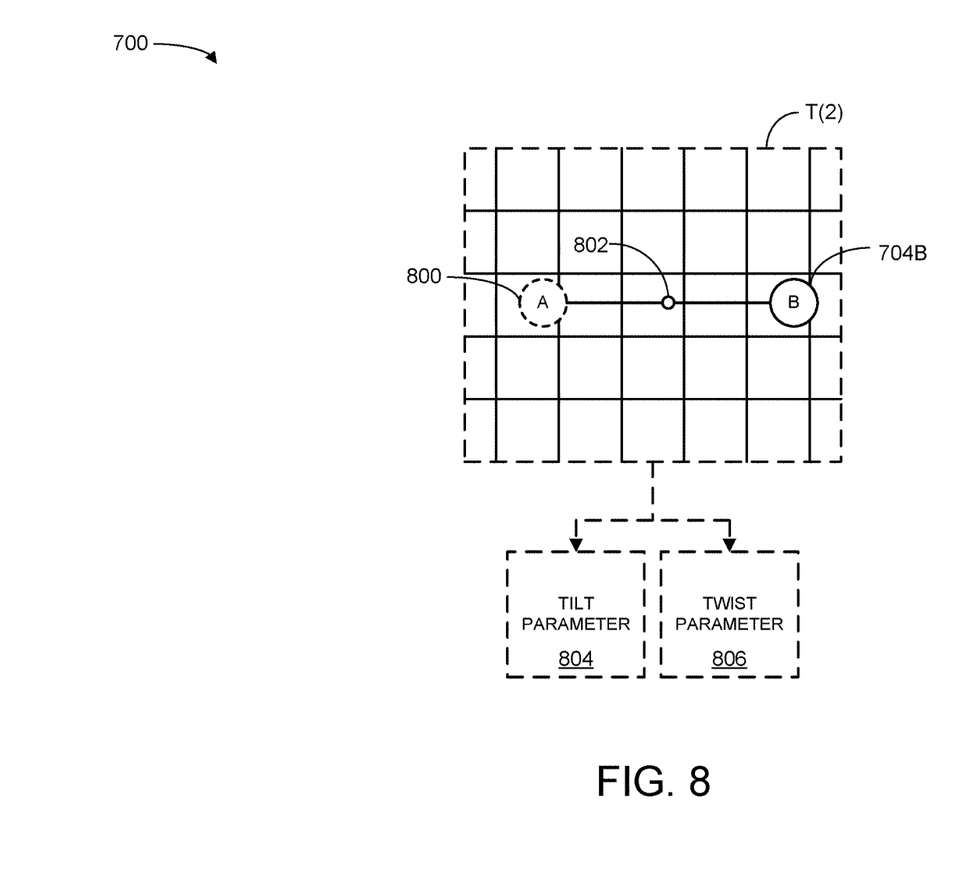
FIG. 8 illustrates calculation of tilt parameters and twist parameters based on active stylus electrode locations.

As indicated above, once the reference time frame locations of both the first and second stylus electrodes are known, such locations can be used to determine a position of the active stylus, which can include a location at which the touch-sensitive display device should register touch input (e.g., a tip position of the active stylus), calculate a tilt parameter of the active stylus, and/or calculate a twist parameter of the active stylus. This is schematically shown in FIG. 8, which again shows touch-sensor matrix 700 during time frame T(2). In FIG. 8, the reference time frame location of the second stylus electrode is again shown at position 704B. Further, the non-reference location of the first stylus electrode has been velocity corrected to give a reference time frame location 800 of the first stylus electrode, shown with a dashed circle.

As the locations of both the first and second stylus electrodes in the same time frame (i.e., the reference time frame) are now known, these locations can be used to calculate a position of the active stylus, from which a variety of properties can be derived. Specifically, these locations may be combined to determine a position of a tip of the active stylus relative to the plurality of touch-sensing electrodes, and the position of the tip may be interpreted as a location of touch input provided to the touch-sensitive display device. The locations of the stylus electrodes may be combined in any suitable way, depending on the number of stylus electrodes and their positions relative to each other and to the active stylus. In some cases, combining the locations of the stylus electrodes may simply include averaging the locations of the stylus electrodes. FIG. 8 shows the position 802 of the tip of the active stylus, determined as described above.

The reference time frame locations of the first and second stylus electrodes may be used to calculate one or both of a tilt parameter and a twist parameter of the active stylus. This is schematically shown in FIG. 8, as based on the reference time frame locations of the two stylus electrodes, a tilt parameter 804 and a twist parameter 806 have been calculated. As indicated above, a tilt parameter may include one or more angles specifying the orientation or attitude of the active stylus relative to the touch-sensitive display device, while a twist parameter may define rotation of the stylus about an elongate axis extending to the stylus body. Each of these values can then be leveraged by software running on the touch-sensitive display device, and/or any associated computing devices, thereby allowing users to perform more sophisticated touch input.

In some examples, the twist parameter of the active stylus is calculated based on the relative locations of the first and second stylus electrodes during the reference time frame. As an example, the twist parameter may be given by the angle of a line running through the reference time frame locations of the first and second stylus electrodes. Further, in some examples, the tilt parameter of the active stylus is calculated based on a relative magnitude of the spatial capacitance measurements received for the first and second stylus electrodes. As an example, if a measurement received for the first stylus electrode has a higher magnitude than a measurement received for the second stylus electrode, it may indicate that the stylus is tilted in the direction of the first stylus electrode. In other examples, however, the tilt and/or twist parameters of the active stylus may be calculated in other suitable ways.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
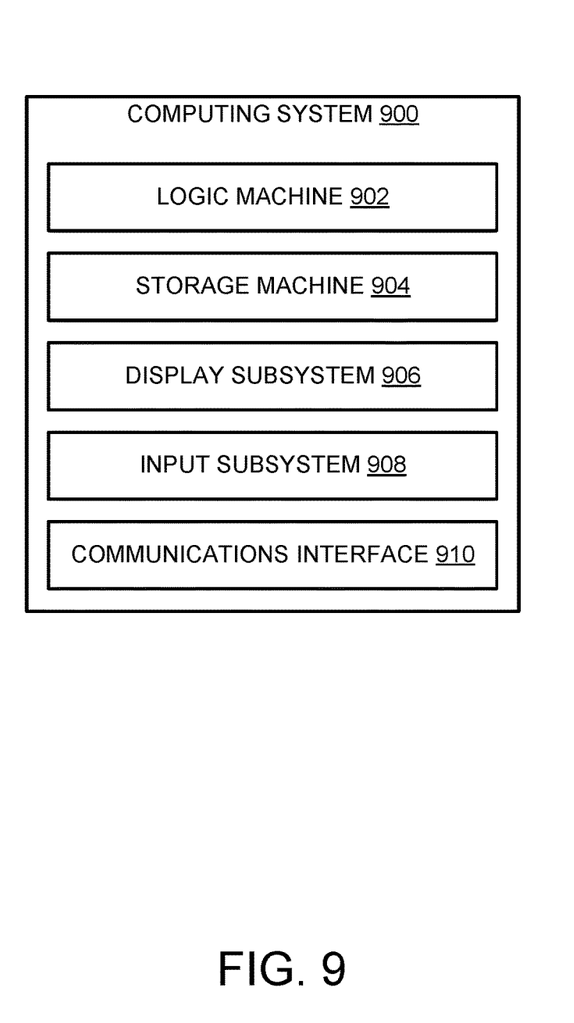
FIG. 9 schematically depicts an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, touch-sensitive display devices, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In an example, a touch-sensitive display device comprises: a touch sensor having a plurality of touch-sensing electrodes; and control logic coupled to the plurality of touch-sensing electrodes, the control logic being configured to: in a non-reference time frame, based on a spatial capacitance measurement received for a first stylus electrode of an active stylus, estimate a non-reference time frame location of the first stylus electrode relative to the plurality of touch-sensing electrodes; in a reference time frame, based on a spatial capacitance measurement received for a second stylus electrode of the active stylus, estimate a reference time frame location of the second stylus electrode relative to the plurality of touch-sensing electrodes; and based on an estimated velocity of the first stylus electrode, velocity correct the non-reference time frame location of the first stylus electrode to give a reference time frame location of the first stylus electrode. In this example or any other example, the estimated velocity of the first stylus electrode is calculated by estimating a current location of the first stylus electrode during each of a series of previous time frames, and calculating a rate of movement of the first stylus electrode during the series of previous time frames. In this example or any other example, the series of previous time frames is selected from a sliding window of time frames preceding a current time frame. In this example or any other example, the reference time frame happens after the non-reference time frame. In this example or any other example, velocity correcting the non-reference time frame location of the first stylus electrode includes multiplying the estimated velocity of the first stylus electrode by an elapsed time since the non-reference time frame to give an estimated offset of the first stylus electrode, and offsetting the non-reference time frame location of the first stylus electrode by the estimated offset to give the reference time frame location of the first stylus electrode. In this example or any other example, the control logic is further configured to determine a location of a tip of the active stylus relative to the plurality of touch-sensing electrodes based on the reference time frame locations of the first and second stylus electrodes, and interpret the location of the tip of the active stylus as a location of a touch input provided to the touch-sensitive display device. In this example or any other example, the first and second stylus electrodes are disposed within the tip of the active stylus. In this example or any other example, the first stylus electrode is disposed within the tip of the active stylus, and the second stylus electrode is disposed within a ring encircling a body of the active stylus. In this example or any other example, the control logic is further configured to, based on a relative magnitude of the spatial capacitance measurements received for the first and second stylus electrodes, calculate a tilt parameter of the active stylus. In this example or any other example, the control logic is further configured to, based on the reference time frame locations of the first and second stylus electrodes, calculate a twist parameter of the active stylus.

In an example, a method for a touch-sensitive display device comprises: in a non-reference time frame, based on a spatial capacitance measurement received for a first stylus electrode of an active stylus, estimating a non-reference time frame location of the first stylus electrode relative to a plurality of touch-sensing electrodes of the touch-sensitive display device; in a reference time frame, based on a spatial capacitance measurement received for a second stylus electrode of the active stylus, estimating a reference time frame location of the second stylus electrode relative to the plurality of touch-sensing electrodes; and based on an estimated velocity of the first stylus electrode, velocity correcting the non-reference time frame location of the first stylus electrode to give a reference time frame location of the first stylus electrode. In this example or any other example, the estimated velocity of the first stylus electrode is calculated by estimating a current location of the first stylus electrode during each of a series of previous time frames, and calculating a rate of movement of the first stylus electrode during the series of previous time frames. In this example or any other example, the series of previous time frames is selected from a sliding window of time frames preceding a current time frame. In this example or any other example, the reference time frame happens after the non-reference time frame, and velocity correcting the non-reference time frame location of the first stylus electrode includes multiplying the estimated velocity of the first stylus electrode by an elapsed time since the non-reference time frame to give an estimated offset of the first stylus electrode, and offsetting the non-reference time frame location of the first stylus electrode by the estimated offset to give the reference time frame location of the first stylus electrode. In this example or any other example, the method further comprises determining a location of a tip of the active stylus relative to the plurality of touch-sensing electrodes based on the reference time frame locations of the first and second stylus electrodes, and interpreting the location of the tip of the active stylus as a location of a touch input provided to the touch-sensitive display device. In this example or any other example, the first and second stylus electrodes are disposed within the tip of the active stylus. In this example or any other example, the first stylus electrode is disposed within the tip of the active stylus, and the second stylus electrode is disposed within a ring encircling a body of the active stylus. In this example or any other example, the method further comprises, based on a relative magnitude of the spatial capacitance measurements received for the first and second stylus electrodes, calculating a tilt parameter of the active stylus. In this example or any other example, the method further comprises, based on the reference time frame locations of the first and second stylus electrodes, calculating a twist parameter of the active stylus.

In an example, a touch-sensitive display device comprises: a touch sensor having a plurality of touch-sensing electrodes; and control logic coupled to the plurality of touch-sensing electrodes, the control logic being configured to: in a non-reference time frame, receive a first spatial capacitance measurement for a first stylus electrode of an active stylus; in a reference time frame, receive a second spatial capacitance measurement for a second stylus electrode of the active stylus; based on an estimated velocity of one or both of the first and second stylus electrodes, velocity correct the first spatial capacitance measurement; and using the velocity corrected first spatial capacitance measurement and the second spatial capacitance measurement, determine reference time frame locations of the first and second stylus electrodes.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive display device, comprising:
   a touch sensor having a plurality of touch-sensing electrodes; and
   control logic coupled to the plurality of touch-sensing electrodes, the control logic being configured to:
      in a non-reference time frame, based on a spatial capacitance measurement received for a first stylus electrode of an active stylus, estimate a non-reference time frame location of the first stylus electrode relative to the plurality of touch-sensing electrodes, wherein no spatial capacitance measurements for a second stylus electrode of the active stylus are received during the non-reference time frame;
      in a reference time frame, based on a spatial capacitance measurement received for the second stylus electrode of the active stylus, estimate a reference time frame location of the second stylus electrode relative to the plurality of touch-sensing electrodes, wherein no spatial capacitance measurements for the first stylus electrode of the active stylus are received during the reference time frame;
      based on an estimated velocity of the first stylus electrode, velocity correct the non-reference time frame location of the first stylus electrode to give a reference time frame location of the first stylus electrode; and
      based on the reference time frame locations of the first and second stylus electrodes, determine a location of a tip of the active stylus relative to the plurality of touch-sensing electrodes.

2. The touch-sensitive display device of claim 1, where the estimated velocity of the first stylus electrode is calculated by estimating a current location of the first stylus electrode during each of a series of previous time frames, and calculating a rate of movement of the first stylus electrode during the series of previous time frames.

3. The touch-sensitive display device of claim 2, where the series of previous time frames is selected from a sliding window of time frames preceding a current time frame.

4. The touch-sensitive display device of claim 1, where the reference time frame happens after the non-reference time frame.

5. The touch-sensitive display device of claim 4, where velocity correcting the non-reference time frame location of the first stylus electrode includes multiplying the estimated velocity of the first stylus electrode by an elapsed time since the non-reference time frame to give an estimated offset of the first stylus electrode, and offsetting the non-reference time frame location of the first stylus electrode by the estimated offset to give the reference time frame location of the first stylus electrode.

6. The touch-sensitive display device of claim 1, where the control logic is further configured to interpret the location of the tip of the active stylus as a location of a touch input provided to the touch-sensitive display device.

7. The touch-sensitive display device of claim 6, where the first and second stylus electrodes are disposed within the tip of the active stylus.

8. The touch-sensitive display device of claim 6, where the first stylus electrode is disposed within the tip of the active stylus, and the second stylus electrode is disposed within a ring encircling a body of the active stylus.

9. The touch-sensitive display device of claim 1, where the control logic is further configured to, based on a relative magnitude of the spatial capacitance measurements received for the first and second stylus electrodes, calculate a tilt parameter of the active stylus.

10. The touch-sensitive display device of claim 1, where the control logic is further configured to, based on the reference time frame locations of the first and second stylus electrodes, calculate a twist parameter of the active stylus.

11. A method for a touch-sensitive display device, comprising:
   in a non-reference time frame, based on a spatial capacitance measurement received for a first stylus electrode of an active stylus, estimating a non-reference time frame location of the first stylus electrode relative to a plurality of touch-sensing electrodes of the touch-sensitive display device, wherein no spatial capacitance measurements for a second stylus electrode of the active stylus are received during the non-reference time frame;
   in a reference time frame, based on a spatial capacitance measurement received for the second stylus electrode of the active stylus, estimating a reference time frame location of the second stylus electrode relative to the plurality of touch-sensing electrodes, wherein no spatial capacitance measurements for the first stylus electrode are received during the reference time frame;
   based on an estimated velocity of the first stylus electrode, velocity correcting the non-reference time frame location of the first stylus electrode to give a reference time frame location of the first stylus electrode; and
   based on the reference time frame locations of the first and second stylus electrodes, determining a location of a tip of the active stylus relative to the plurality of touch-sensing electrodes.

12. The method of claim 11, where the estimated velocity of the first stylus electrode is calculated by estimating a current location of the first stylus electrode during each of a series of previous time frames, and calculating a rate of movement of the first stylus electrode during the series of previous time frames.

13. The method of claim 12, where the series of previous time frames is selected from a sliding window of time frames preceding a current time frame.

14. The method of claim 11, where the reference time frame happens after the non-reference time frame, and where velocity correcting the non-reference time frame location of the first stylus electrode includes multiplying the estimated velocity of the first stylus electrode by an elapsed time since the non-reference time frame to give an estimated offset of the first stylus electrode, and offsetting the non-reference time frame location of the first stylus electrode by the estimated offset to give the reference time frame location of the first stylus electrode.

15. The method of claim 11, further comprising interpreting the location of the tip of the active stylus as a location of a touch input provided to the touch-sensitive display device.

16. The method of claim 15, where the first and second stylus electrodes are disposed within the tip of the active stylus.

17. The method of claim 15, where the first stylus electrode is disposed within the tip of the active stylus, and the second stylus electrode is disposed within a ring encircling a body of the active stylus.

18. The method of claim 11, further comprising, based on a relative magnitude of the spatial capacitance measurements received for the first and second stylus electrodes, calculating a tilt parameter of the active stylus.

19. The method of claim 11, further comprising, based on the reference time frame locations of the first and second stylus electrodes, calculating a twist parameter of the active stylus.

20. A touch-sensitive display device, comprising:
   a touch sensor having a plurality of touch-sensing electrodes; and
   control logic coupled to the plurality of touch-sensing electrodes, the control logic being configured to:
      in a non-reference time frame, receive a first spatial capacitance measurement for a first stylus electrode of an active stylus, wherein no spatial capacitance measurements for a second stylus electrode of the active stylus are received during the non-reference time frame;
      in a reference time frame, receive a second spatial capacitance measurement for the second stylus electrode of the active stylus, wherein no spatial capacitance measurements for the first stylus electrode are received during the reference time frame;
      based on an estimated velocity of one or both of the first and second stylus electrodes, velocity correct the first spatial capacitance measurement;
      using the velocity corrected first spatial capacitance measurement and the second spatial capacitance measurement, determine reference time frame locations of the first and second stylus electrodes; and
      based on the reference time frame locations of the first and second stylus electrodes, determine a tip location of the active stylus.

* * * * *